United States Patent
Garud et al.

(10) Patent No.: US 12,302,007 B2
(45) Date of Patent: May 13, 2025

(54) RGBIR COLOR FILTER IMAGE PROCESSING WITH LENS SHADING CORRECTION

(71) Applicant: TEXAS INSTRUMENTS INCORPORATED, Dallas, TX (US)

(72) Inventors: Hrushikesh Garud, Bangalore (IN); Rajasekhar Allu, Plano, TX (US); Gang Hua, Katy, TX (US); Jing-Fei Ren, Dallas, TX (US); Mayank Mangla, Allen, TX (US); Niraj Nandan, Plano, TX (US); Mihir Mody, Bangalore (IN); Pandy Kalimuthu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 95 days.

(21) Appl. No.: 18/147,964

(22) Filed: Dec. 29, 2022

(65) Prior Publication Data
US 2024/0040266 A1   Feb. 1, 2024

Related U.S. Application Data

(60) Provisional application No. 63/393,310, filed on Jul. 29, 2022.

(51) Int. Cl.
| | |
|---|---|
| *H04N 23/76* | (2023.01) |
| *H04N 23/11* | (2023.01) |
| *H04N 23/667* | (2023.01) |
| *H04N 23/81* | (2023.01) |
| *H04N 23/84* | (2023.01) |

(52) U.S. Cl.
CPC ............ *H04N 23/76* (2023.01); *H04N 23/11* (2023.01); *H04N 23/81* (2023.01); *H04N 23/843* (2023.01); *H04N 23/667* (2023.01)

(58) Field of Classification Search
None
See application file for complete search history.

(56) References Cited

U.S. PATENT DOCUMENTS

| | | | |
|---|---|---|---|
| 2018/0336664 A1* | 11/2018 | Ono ................. | H04N 23/45 |
| 2022/0014728 A1* | 1/2022 | Deighton ........... | G09G 3/03 |

FOREIGN PATENT DOCUMENTS

| | | | | |
|---|---|---|---|---|
| EP | 4109894 A1 * | 12/2022 | ........... | G06V 10/143 |

\* cited by examiner

*Primary Examiner* — Christopher Braniff
(74) *Attorney, Agent, or Firm* — Xianghui Huang; Frank D. Cimino

(57) ABSTRACT

A system is provided. The system generally includes a first processor configured to receive image input data from a red-green-blue infrared (RGBIR) sensor. The first processor of the system is configured to generate a first intermediate image data from the image input data. The system generally includes a second processor. The second processor of the system is configured to generate a second intermediate image data that includes red-green-blue (RGB) image data from the first intermediate image data, and to generate a third intermediate image data that includes infrared (IR) image data from the first intermediate image data. The system generally includes a third processor. The third processor of the system is configured to process the third intermediate image data. The system generally includes a fourth processor. The fourth processor of the system is configured to process the second image data.

20 Claims, 12 Drawing Sheets

RGBIR COLOR FILTER IMAGE PROCESSING WITH LENS SHADING CORRECTION

CROSS-REFERENCE TO RELATED APPLICATIONS

This application claims the benefit of and priority to U.S. Provisional Patent Application No. 63/393,310, filed Jul. 29, 2022, which is incorporated by reference herein in its entirety.

TECHNICAL FIELD

Examples of the present disclosure generally relate to image signal processors with lens shading correction.

BACKGROUND

Image sensors typically used in real-time applications, e.g., automotive, surveillance, and robotic applications, typically provide raw sensor data in the form of a matrix, which is an m×n array of pixels (where m and n are the dimensions of the sensor) in which each pixel carries information about one color channel due to a segment of a color filter array (CFA) disposed directly above the pixel. Image signal processors coupled to these image sensors can produce full resolution color images even though each pixel only captures a subset of the color space. Image processors can perform other processes on the sensor data, including but not limited to dark current subtraction, lens shading correction (LSC), chromatic aberration correction, color filter array interpolation (de-mosaicing), noise filtering (NF), tone mapping (TM) and color space conversion.

These image signal processors may be application specific integrated circuits (ASICs) or hardware accelerators that implement these image processes in a pipeline to produce monochrome or multi-color digital images. Some image processors are integrated with system-on-chip (SoC) solutions and are capable of processing 2×2 CFA patterned sensor inputs. Some such image processors produce a final output without requiring to store intermediate data generated by the various image processes.

SUMMARY

This Summary does not limit the scope or meaning of the claims.

According to some examples, a system is described herein. The system generally includes a first processor configured to receive image input data from a red-green-blue infrared (RGBIR) sensor, the image input data comprising RGBIR image data. The first processor of the system is generally configured to generate a first intermediate image data from the image input data. The system generally includes a second processor coupled to the first processor. The second processor of the system is generally configured to receive the first intermediate image data from the first processor, to generate a second intermediate image data that includes red-green-blue (RGB) image data from the first intermediate image data, and to generate a third intermediate image data that includes infrared (IR) image data from the first intermediate image data. The system generally includes a third processor coupled to the second processor. The third processor of the system is generally configured to receive the third intermediate image data from the second processor and to process the third intermediate image data. The system generally includes a fourth processor coupled to the second processor. The fourth processor of the system is generally configured to receive the second intermediate image data from the second processor and to process the second image data.

According to some examples, a system is described herein. The system generally includes a red-green-blue infrared (RGBIR) sensor. The system generally includes a first processor configured to receive image input data from the RGBIR sensor, the image input data comprising RGBIR image data, and to generate a first intermediate image data from the image input data. The system generally includes a second processor coupled to the first processor. The second processor is generally configured to generate a second intermediate image data that includes red-green-blue (RGB) image data from the first intermediate image data, and to generate a third intermediate image data that includes infrared (IR) image data from the first intermediate image data. The system generally includes a third processor coupled to the second processor. The third processor is generally configured to process the third intermediate image data. The system generally includes a fourth processor coupled to the second processor, and the third processor is configured to process the second image data.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
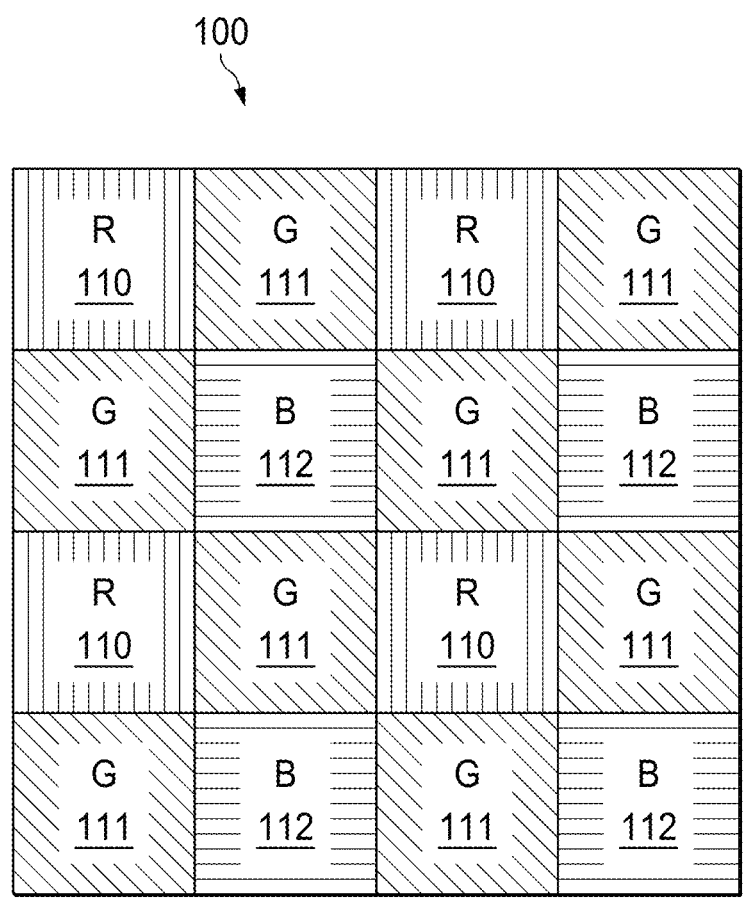
FIGS. 1A and 1B are example color filter array (CFA) patterns.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe programmable image signal processing architecture that allows for the processing of different types of input image data (e.g., 2×2 Bayer color filter array patterns; 4×4 red-green-blue infrared color filter array patterns). Specifically, the input image data can include a combination of different color channels, and some examples of the programmable image signal processing architecture described herein separate the input image data based on the different color channels.

FIG. 1A is an example color filter array (CFA) pattern. A CFA pattern is a mosaic of tiny optical color filters (e.g., Red (R) 110, Green (G) 111, and Blue(B) 112, Clear(C)) (also referred to as channels) placed over the pixel sensors of an image sensor such that only single-color filter is present at each pixel location. The size of the smallest element of the pattern in which optical color filters are arranged is variable. FIG. 1A illustrates a 2×2 Bayer CFA pattern mosaic 100. Other CFA patterns include different patterns of 2 to 4 types of optical color filters, for example RCCC, RCBC, Bayer, RGBC. In a Bayer 2×2 CFA as illustrated in FIG. 1, 50% of the sensor pixels are green pixels 111, 25% are red pixels 110, and 25% are blue pixels 112. For consumption by a human or machine, an image signal processing pipeline performs a process referred to as CFA interpolation in which image pixels are up-sampled from one color per location to three colors per location.

A new type of image sensor referred to as an RGB-Infrared (RGBIR) sensor is becoming of interest for use in vision applications and can capture 4×4 CFA patterns. Considering the limitations of the existing hardware solutions, image signal processing architectures can include image processors updated to process 4×4 CFA patterns. However, updating image processors to process 4×4 CFA patterns can be more expensive in terms of compute requirements and development effort as well.

A type of image sensor referred to as an RGB-Infrared (RGBIR) sensor is becoming of interest for use in vision applications and can capture 4×4 CFA patterns. The RGBIR sensors record both color and IR photons on a single sensor with the same lens producing perfectly-aligned RGB and IR images. These sensors and their corresponding image data allow for, but are not limited to, day and night photography, reduced-blur imaging, 3D sensing, biometrics, and driver and occupant monitoring systems (DMS, OMS). For DMS and OMS, RGBIR sensors and the RGBIR image data can assist various car assessment programs and vehicle safety regulations, where the IR images are obtained with active illumination. For example, the RGBIR sensors and corresponding RGBIR image data can capture near IR wavelengths used in driving-related safety related applications, such as driver attentiveness monitoring, driver drowsiness detection, occupant monitoring etc. Furthermore, the RGBIR sensors and corresponding RGBIR image data can capture color images used in comfort-convenience applications, such as personalized configuration of climate control, infotainment configuration, gesture control, video conferencing etc.

Figure 1B:
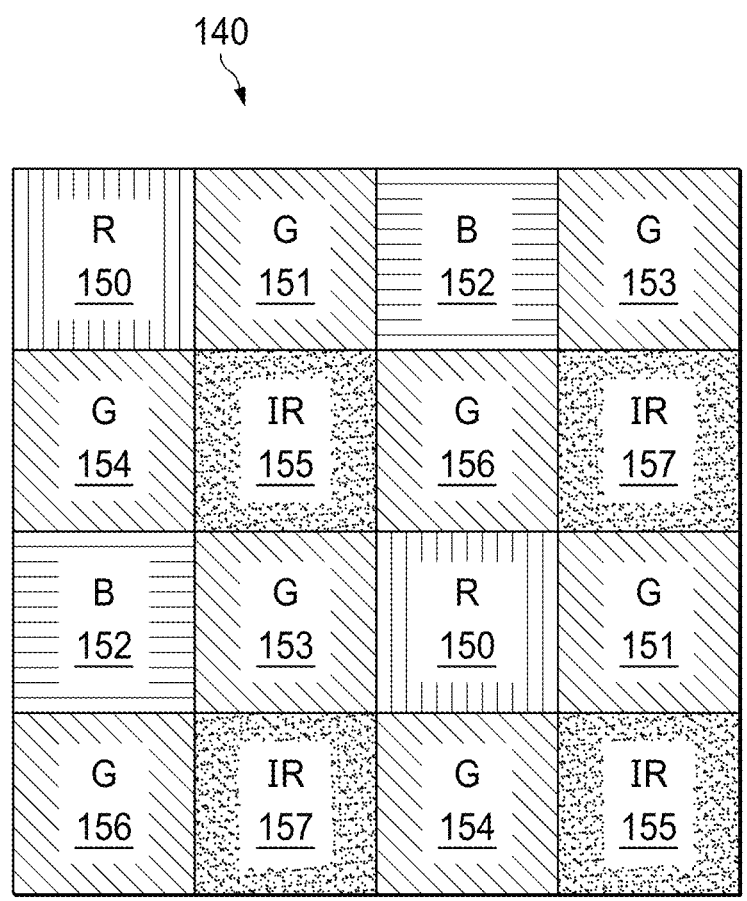

FIG. 1B is another example CFA pattern like the CFA pattern of FIG. 1A; however, the CFA pattern 140 of FIG. 1B includes IR filters disposed among the color filters. Accordingly, FIG. 1B illustrates an example RGBIR CFA pattern 140. In a 4×4 RGBIR CFA pattern 140, 50% of the filters are green pixels, 25% are IR pixels, 12.5% are red pixels, and 12.5% are blue pixels.

As described herein, an input CFA pixel can be described based on their unique neighborhood. For example, in the 4×4 RGBIR CFA pattern 140, eight such unique neighborhoods can be identified and are referred to here as phases: phase 0 (P0) (sensor pixel 150), which are the red pixels of the CFA pattern 1; phase 1 (P1) (sensor pixel 151), which is the green sensor pixel of the CFA pattern 140 with P0 sensor pixel 150 to the left and P2 sensor pixel 152 to the right; phase 2 (P2) (sensor pixel 152), which are the blue sensor pixels of the CFA pattern 140; phase 3 (P3) (sensor pixel 153), which is the green sensor pixel of the CFA pattern 140 with P2 sensor pixel 152 to the left and P0 sensor pixel 150 to the right; phase 4 (P4) (sensor pixel 154), which is the green sensor pixel of the CFA pattern 140 with P0 sensor pixel 150 to top and P2 sensor pixel 152 to the bottom; phase 5 (P5) (sensor pixel 155), which is the IR sensor pixel of the CFA pattern 140 with P4 sensor pixel 154 to the left and phase 6 (P6) pixel 156 to the right; P6 (sensor pixel 156), which is the green sensor pixel of the CFA pattern 140 with P2 sensor pixel 152 to top and P0 sensor pixel 150 to the bottom; and phase 7 (P7) (sensor pixel 157), which is the IR sensor pixel of the CFA pattern 140 with P6 sensor pixel 156 to the left and P4 sensor pixel 154 to the right.

Figure 2:
FIG. 2 is a grid annotating pixel positions from a current pixel of a CFA pattern.

FIG. 2 is a grid 200 annotating sensor pixel positions from a current sensor pixel as referred herein when discussing neighboring pixels of a CFA pattern (e.g., CFA pattern 100 of FIG. 1A). When referring to the neighboring sensor pixels in context of a sensor pixel being processed, neighboring sensor pixels may be referred to herein based on their position relative to a current sensor pixel 207. For example, a respective weighting factor may be applied to the current sensor pixel 207 and each of the neighboring sensor pixels to determine an output sensor pixel value. As illustrated in FIG. 2, sensor pixel 207 is the current sensor pixel. Sensor pixel 203 is the top sensor pixel relative to the current sensor pixel 207 and is disposed on top of the current sensor pixel 207. Sensor pixel 202 is the top-left pixel relative to the current sensor pixel 207, and is left of the top sensor pixel 203. Sensor pixel 204 is the top-right sensor pixel relative to the current sensor pixel 207, and is right of the top sensor pixel 203. Sensor pixel 201 is the skip 1 top sensor pixel relative to the current sensor pixel 207 and is disposed on top of sensor pixel 203 and one sensor pixel away from the current sensor pixel 207. Sensor pixel 208 is the right sensor pixel relative to the current sensor pixel 207 and is disposed right of the current sensor pixel 207. Sensor pixel 209 is the skip 1 right sensor pixel relative to the current sensor pixel 207 and is disposed right of sensor pixel 208 and one sensor pixel away from the current sensor pixel 207. Sensor pixel 211 is the bottom sensor pixel relative to the current sensor pixel 207 and is disposed below the current sensor pixel 207. Sensor pixel 210 is the bottom-left sensor pixel relative to the current sensor pixel 207 and is disposed left of the bottom pixel 211. Sensor pixel 212 is the bottom-right sensor pixel relative to the current sensor pixel 207 and is disposed right of the bottom sensor pixel 211. Sensor pixel 213 is the skip 1 bottom sensor pixel relative to the current sensor pixel 207 and is disposed below sensor pixel 211 and one sensor pixel away from the current sensor pixel 207. Sensor pixel 206 is the left sensor pixel relative to the current sensor pixel 207 and is disposed left of the current sensor pixel 207. Sensor pixel 205 is the skip 1 left sensor pixel relative to the current sensor pixel 207 and is disposed left of sensor pixel 206 and one sensor pixel away from the current sensor pixel 207. Further processing algorithms may consider pixels even further removed from the current sensor pixel 207.

Compared to simpler CFAs and sensors, RGBIR image sensors may provide quantitively different challenges for image signal processors. For example, some image signal processor algorithms rely on a color channel of an image having at least 25% sensor density to interpolate missing color channel information. However, for some RGBIR sensors, R and B pixels do not have sufficient neighbors due to their 12.5% density. Accordingly, this assumption affects the utility of some defective pixel correction (DPC), lens shading correction (LSC), noise filtering (NF), tone mapping (TM), statistics collection (H3A) and de-mosaicing processes available.

Another issue with some image signal processors with the RGBIR sensors involves the RGB optical color filters. R, G and B optical color filters allow the IR light to pass through and reach the underlying image pixels. Some RGBIR cameras use a dual-band filter (DBF) to simultaneously capture the visible and IR wavelength light.

Figure 3A:
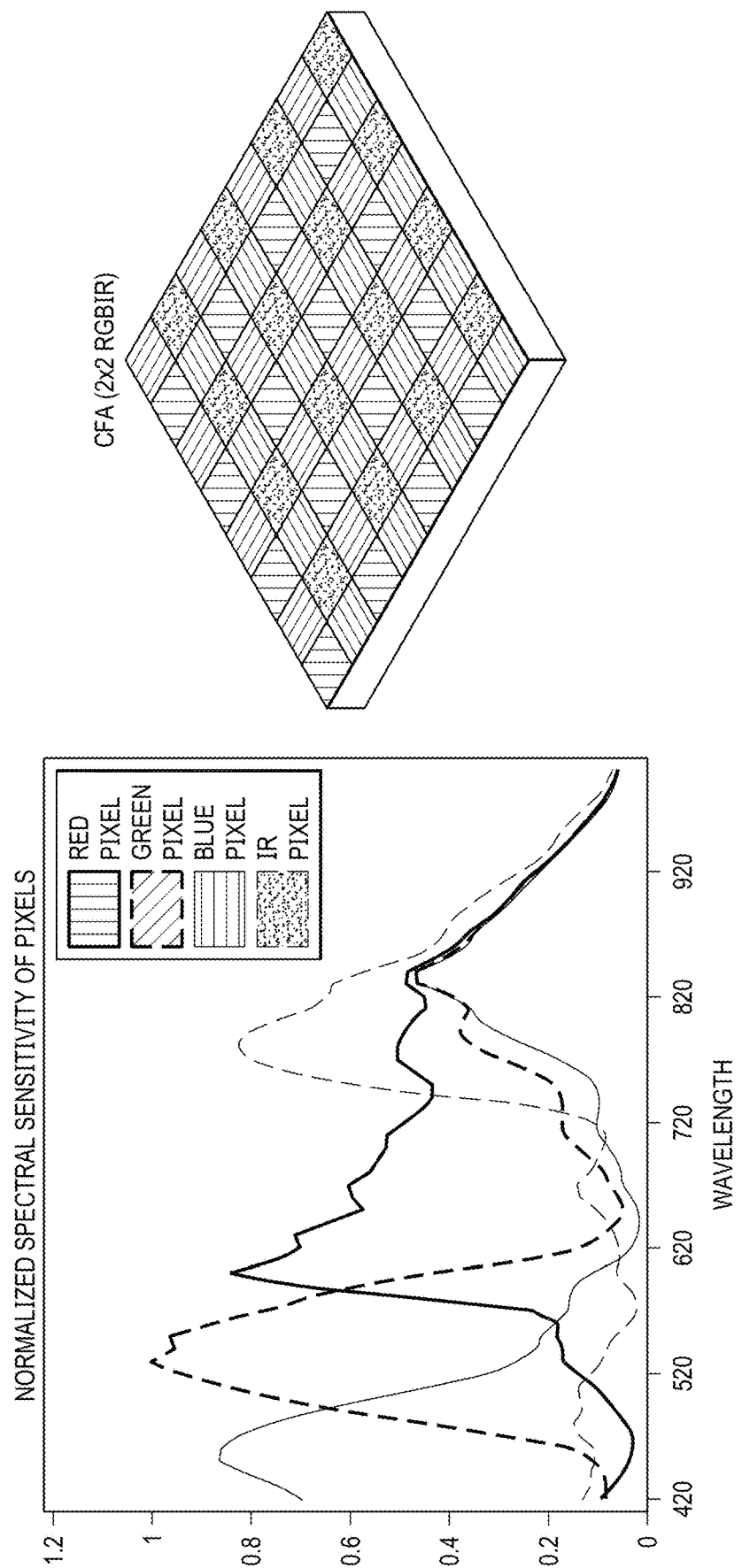
FIGS. 3A and 3B are graphs of normalized spectral sensitivity of pixels of CFA patterns.
Figure 3B:
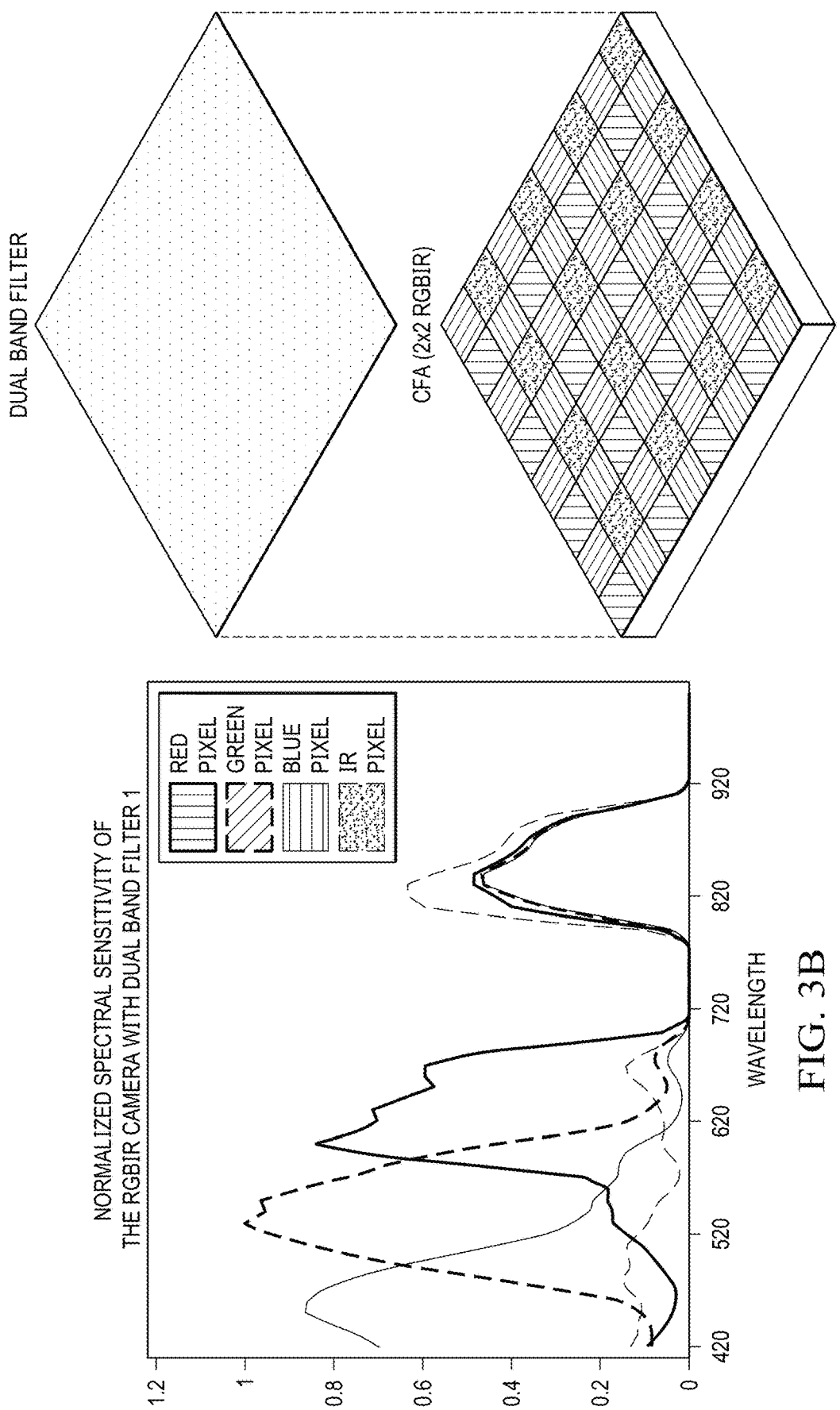

FIGS. 3A and 3B are graphs of normalized spectral sensitivity of image pixels of CFA patterns. FIG. 3A is a graph of normalized spectral sensitivity of image pixels to various wavelengths of light without a filter, and FIG. 3B is a graph of modified sensitivities due to the dual band filter. As illustrated in both FIGS. 3A and 3B, the R, G and B pixels also receive the IR wavelength light. Thus, as illustrated in FIGS. 3A and 3A, the corresponding image pixel output values are mix of visible and IR light. In other words, R, G and B image pixel outputs are contaminated with IR light. Accordingly, some image signal processors may not be able to remove IR light from the R, G and B image pixels.

Further, in the applications such as DMS, image signal processors can use the RGBIR image sensor in two sets of settings and/or modes: (1) IR dominant mode; and (2) RGB dominant mode. When the RGBIR image sensor is in IR dominant mode, the RGBIR camera captures an image in synchronization with active IR illumination and the image signal processor processes the image with parameter settings primarily tuned to obtain output IR images with optimal quality. When the RGBIR image sensor is in RGB dominant mode, the RGBIR image sensor captures an image without synchronized active illumination and the image signal processor processes the image with parameter settings primarily tuned to obtain high quality output color images for the given scene lighting and operational constraints of the system such as desired framerate. Accordingly, the image sensor's settings and parameter settings for IR dominant and RGB dominant modes are different. However, some scenarios require alternating between two modes in a desired pattern and changing the image sensor's settings and parameters settings for the corresponding mode in the desired pattern can cause delays and other issues with the RGBIR image sensor and the image processors.

Other issues for image signal processors designed for 4×4 RGBIR CFA processing include: producing high quality full resolution RGB and IR outputs for one sensor input, both in IR dominant or RGB dominant modes of operation; IR subtraction for cross channel talk suppression in single-camera dual-band imaging; processing of the CFA pattern images for DPC; and processing of the CFA pattern images for LSC. Further issues include frame level pipeline control for preferential image quality optimization for RGB or IR images; configurable image processor parameters to optimize the output image quality; image statistics collection for automated image correction processes; and support for multiple camera processing.

Consequently, what is needed is a solution involving image processors that can process the 4×4 RGBIR CFA data and the 2×2 RGB CFA data.

As mentioned, examples herein describe a configurable image signal processing architecture comprising multiple image signal processors. Some of the image signal processors of the architecture described herein can process the 4×4 RGBIR CFA image patterns and the 2×2 RGB CFA image patterns.

Figure 4:
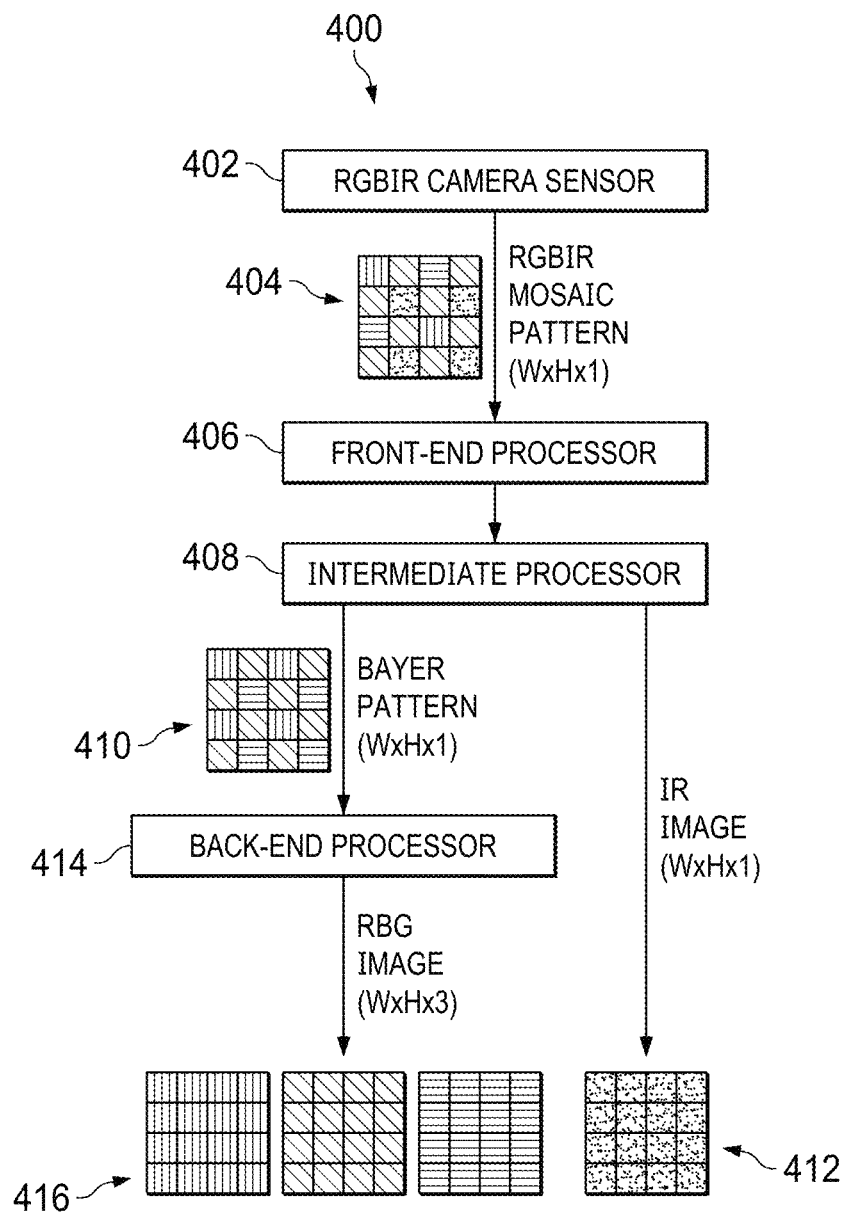
FIG. 4 is a flowchart illustrating an example data path for image data passing through the image signal architecture, according to some examples.

FIG. 4 is a diagram illustrating an example data path for image data passing through the image signal processing architecture described herein. As described herein, the flow 400 demonstrates the path of image signal processing of both 4×4 RGBIR CFA patterns and 2×2 RGB CFA patterns.

As illustrated in FIG. 4, an RGBIR image sensor 402 captures image data 404 comprising RGBIR sensor pixels. As mentioned, an RGBIR image sensor 402 provides an infrared (IR) sensor pixel in addition to the red, green, and blue sensor pixels. That is, an RGBIR image sensor 402 provides raw sensor data 404 in a 4×4 CFA pattern in which one sensor pixel is an IR sensor pixel, one is a red sensor pixel, one is a green sensor pixel, and one is a blue sensor pixel. In some examples, the RGBIR image sensor can be any type of image sensor having color channels that includes a first subset (e.g., RGB) and a second subset (e.g., IR).

The RGBIR camera sensor 402 is coupled to a front-end processor 406 that performs front-end processing. Front-end processing by the front-end processor 406 can include some image signal processing, such as defective pixel correction (DPC) and lens shading correction (LSC), that transforms the raw image data 404 into intermediate image data (not illustrated). Details regarding the front-end processor 406 and the front-end processing are described herein below.

After passing through the front-end processor 406 that performs front-end processing, the generated intermediate image data from the front-end processor 406 goes to an intermediate processor 408 that separates the generated intermediate image data into an RGB CFA pattern data 410 and the IR image data 412. As described herein, the generated intermediate image data from the front-end processor 406 is still a RGBIR CFA pattern, and accordingly, to further process the generated intermediate image data, the intermediate processor 408 generates the RGB image data 410 and the IR image data 412 from the intermediate image data from the front-end processor 406.

The RGB CFA pattern data 410 then passes through a back-end processor 414 that performs back-end processing. Back-end processor 414 can include image signal processing not present in front-end processing, such as Noise Filtering (NF), Tone Mapping (TM), and color processing. The processor that performs back-end processor 414, accordingly, generates RGB image data 416 that can be used by other processes.

Figure 5:
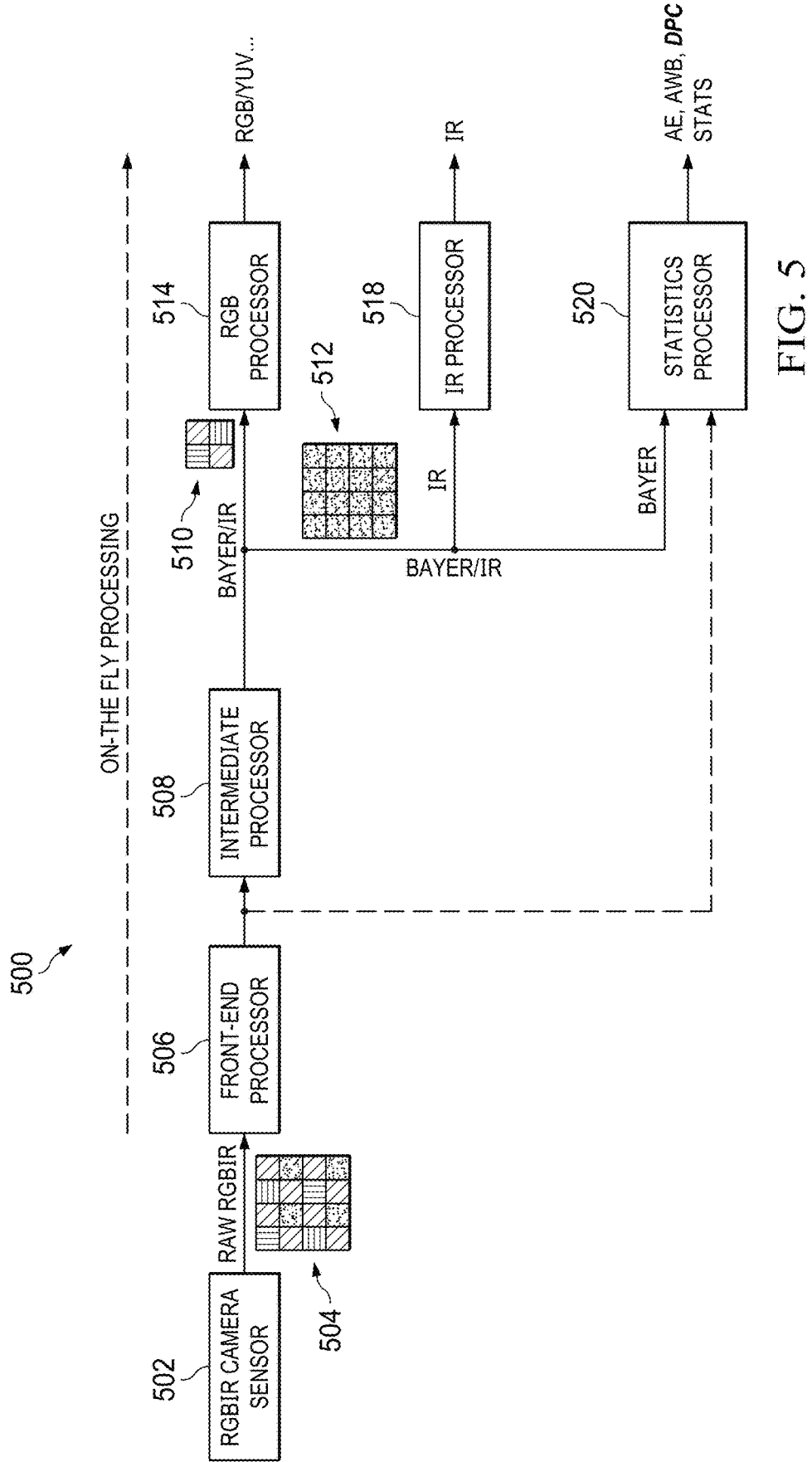
FIG. 5 illustrates an image signal processing system for red-green-blue infrared (RGBIR) image data, according to some examples.

FIG. 5 illustrates an image signal processing system for RGBIR image data, according to some examples. The image signal processing system 500 of FIG. 5 includes the flow 400 of FIG. 4.

The image signal processing system 500 can be coupled to an image sensor 502, such as an RGBIR image sensor 402 of FIG. 4. As described previously, the RGBIR image sensor 502 can capture both RGB channels and an IR channel. The image sensor 502 captures images, which are m×n array of sensor pixels (where m and n are the dimensions of the sensor 502). The image sensor 502 can be 2×2 and 4×4 image sensors, and can have color channels of a first set (e.g., RGB) and a second set (e.g., IR).

The image signal processing system 500 includes a front-end processor 506 (e.g., front-end processor 406 of FIG. 4).

The front-end processor 506 is coupled to the image sensor 502, and the front-end processor 506 receives image data from the image sensor 502. The image data can be RGBIR image data, RGB image data, or IR image data. The front-end processor 506 applies image signal processing to the input image data 504 from the image sensor 502. For example, the front-end processor 506 can apply lens shading correction on the input image data 504, as further described below. In some examples, the front-end processor 506 can perform raw-domain independent DPC on the input image data 504 from the image sensor 502. In some examples, the front-end processor 506 also collects statistics for number and location of the defective pixels detected for use by vision algorithms and diagnostics/safety applications. In such examples, the front-end processor 506 can send the collected statistics to a statistics processor for further processing. The image signal processing by the front-end processor 506 applies to any type of image data (e.g., RGBIR, Bayer, IR).

The image signal processing system 500 includes an intermediate processor 508 (e.g., intermediate processor 408 of FIG. 4). The intermediate processor 508 is coupled to the front-end processor 506. The intermediate processor 508 receives front-end processed image data from the front-end processor 506 and performs further image signal processing on the front-end processed image data. The intermediate processor 508 can perform image processes such as re-mosaicing, upsampling. In some examples, the intermediate processor 508 performs both upsampling and re-mosaicing to create 2×2 Bayer CFA image data patterns 510. These Bayer image data patterns 510 can be processed by other image signal processors in the image signal processing system 500. The intermediate processor 508 also separates the Bayer CFA pattern data 510 from front-end processed image data and the IR image data 512 from the front-end processed image data. In some examples, the intermediate processor 508 can separate upsampled IR image data from re-mosaiced 2×2 Bayer CFA image patterns for IR decontamination or cross-channel talk suppression. Also, the intermediate processor 508 remaps de-mosaiced IR image data to compress the dynamic range. Accordingly, the intermediate processor 508 outputs Bayer RGB CFA pattern data 510 and IR image data 512.

The image signal processing system 500 includes an RGB processor 514 (e.g., back-end processor 414 of FIG. 4), which receives the Bayer RGB CFA pattern data 510 from the intermediate processor 508. The RGB processor 514 is coupled to the intermediate processor 508 and is configured to perform image signal processing on the Bayer CFA pattern from the intermediate processor 508. The RGB processor 514 may perform image signal processing, including but not limited to noise filtering, tone mapping, color processing. The RGB processor 514 then can output RGB image data, YUV image data, or any other image data type without IR filters.

The image signal processing system 500 includes an IR processor 518, which receives the IR image data 512 from the intermediate processor 508. The IR processor 518, like the RGB processor 514, is coupled to the intermediate processor 508 and is configured to perform image signal processing on the IR image data 512 from the intermediate processor 508. The IR processor 518 may perform image signal processing, including but not limited to remapping. The IR processor 518 then can output IR image data or any other image data type without RGB filters.

In some examples, the RGB processor 514 or the IR processor 518 can perform further noise filtering, de-mosaicing, tone mapping, cross-channel talk suppression, color conversion, and other image signal processing.

In some examples, the image signal processing system 500 can include a statistics processor 520. The statistics processor 520 is coupled to the intermediate processor 508 and, in some examples, to the front-end processor 506. The statistics processor 520 receives image data from the intermediate processor 508 or intermediate image data from the front-end processor 506. The statistics collected from the intermediate image data after the front-end processor 506 completes its front-end processing can be used by the statistics processor 520 to generate data for auto-exposure image processes for IR dominant mode. Similarly, the statistics collected from the remosaiced CFA image data from the intermediate processor 508 can be used by the statistics processor 520 to generate data for auto-exposure image processes and auto-white balance processes for RGB dominant mode.

The processors described herein (e.g., the front end processor 506, the intermediate processor 508, RGB processor 514, the IR processor 518, the statistics processor 520) can be implemented as generic or custom processors (e.g., coupled to a memory) and configured to execution instructions stored in such memory. For example, the processors can include one or more, generic or custom, integrated circuits (ICs) (e.g., application-specific integrated circuits (ASICs)), logic circuits, microprocessors, field programmable gate arrays (FPGAs) that may instantiate instructions, central processor units (CPUs), graphic processor units (GPUs), digital signal processors (DSPs), or controllers. In some examples, the processors can include dedicated or general purpose circuitry, and the various processors may be combined or discrete circuitry.

In some examples, the intermediate processor 508 creates a separate 2×2 Bayer pattern specifically to allow simultaneous statistics collection. This separate 2×2 Bayer pattern allows the statistics processor 520 to collect information for exposure control based on the non-IR subtracted green channel to optimize quality or color images, and for white balance correction based on the IR subtracted red, green and blue channels.

In some examples, the separate 2×2 Bayer CFA pattern specifically allows for simultaneous statistics collection of green channel statistics by the statistics processor 520 before (G) and after IR subtraction. In such examples, a separate Bayer output passes to the statistics processor 520, in which one of the green sensor pixels is not decontaminated by the IR subtraction process of the intermediate processor 508. Collection of green channel statistics before and after IR subtraction enables more accurate performance of the auto-exposure and auto-white-balance algorithms that use these statistics.

In some examples, the image signal processing system 500 can disable certain image signal processes depending on the image data received from the image sensor 502. For example, some image signal processes in the image signal processing system 500 are disabled when processing 2×2 CFA patterns. In such example, the re-mosaicing process may be disabled and the IR processor 518 may be disabled. Disabling image signal processes in the image signal processing system 500 is advantageous when the processors of the system 500 are time shared to process the image sensor input from both 2×2 and 4×4 RGBIR image sensors.

As described earlier, the front-end processor 506 performs some image signal processing to the incoming image data from the image sensor 502. Included in the image signal processing by the front-end processor 506 is a lens shading correction process.

Figure 6A:
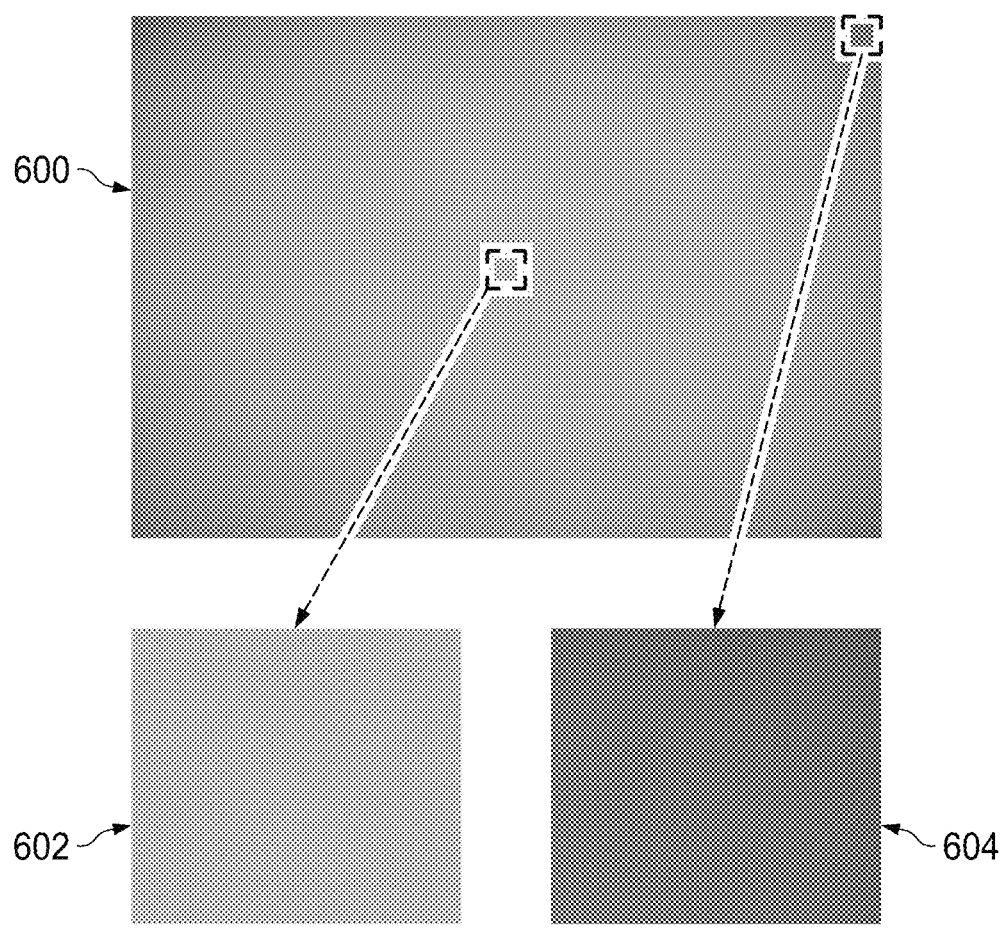
FIGS. 6A and 6B are comparison illustrations of lens shading before and after correction, respectively.
Figure 6B:
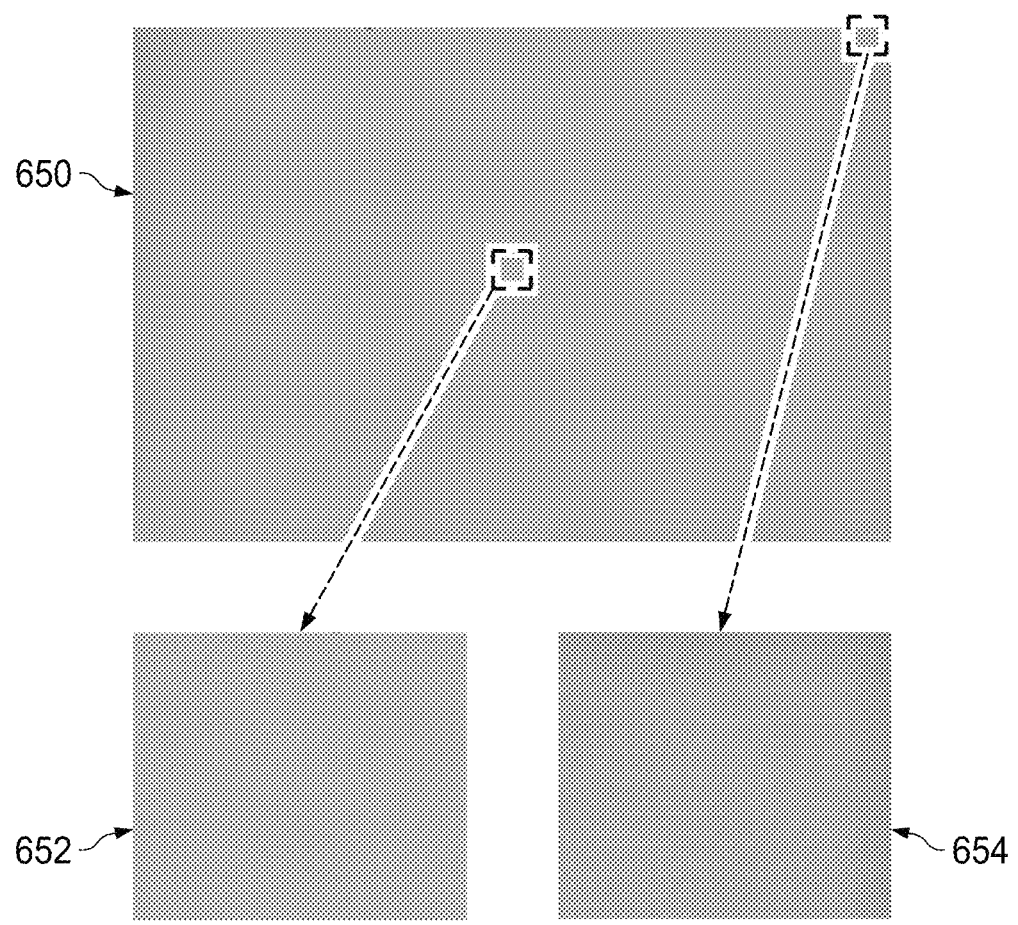

FIGS. 6A and 6B are comparison illustrations of lens shading before and after correction, respectively. Lens shading describes the decrease of image brightness from the center of the image sensor to the corners of the image sensor that are not present in the captured scene. The lens shading may be present due to geometry (field-of-view), mechanical and optical system design, pixel crosstalk and spatially varying IR-cut filter transmission. As illustrated in FIG. 6A, an image pixel 602 closer to the center of an image 600 has a different brightness compared to an image pixel 604 located at or close to a corner of the image 600. After lens shading correction, as illustrated in FIG. 6B, the image pixel 654 (located at or close to the corner of the image 650) has a brightness more similar to the brightness of image pixel 652 (located at or close to the center of the image 650).

The lens shading correction process performed by the front-end processor 506 compensates for the lens shading from the image sensor 502 using flat field or retrospective correction. As described herein, 4 or 8 independent retrospective correction fields (gain maps) for individual color channels or pixel phases present in the raw 2×2 CFA patterns or 4×4 Bayer CFA input can be used. The lens shading correction process thus is defined as:

$$O(x, y) = I(x, y) \times G(x, y)$$

where I(x, y) is the input image pixel value at location (x, y), G(x, y) is the interpolated pixel-level gain value at location (x, y), and O(x, y) is the resulting output image pixel value at location (x, y).

Figure 7:
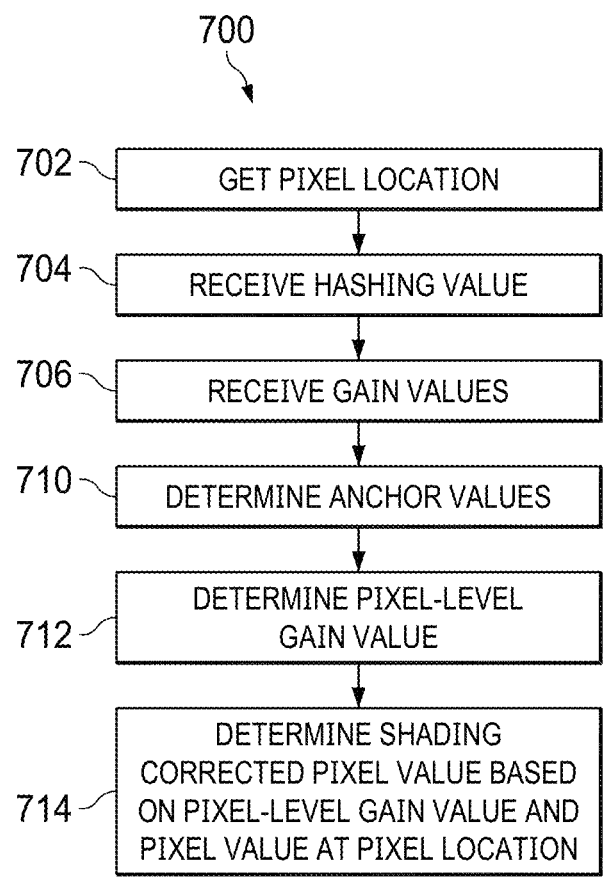
FIG. 7 is a flowchart illustrating the lens shading correction process using gain maps and up-sampling, according to some examples.
Figure 9:
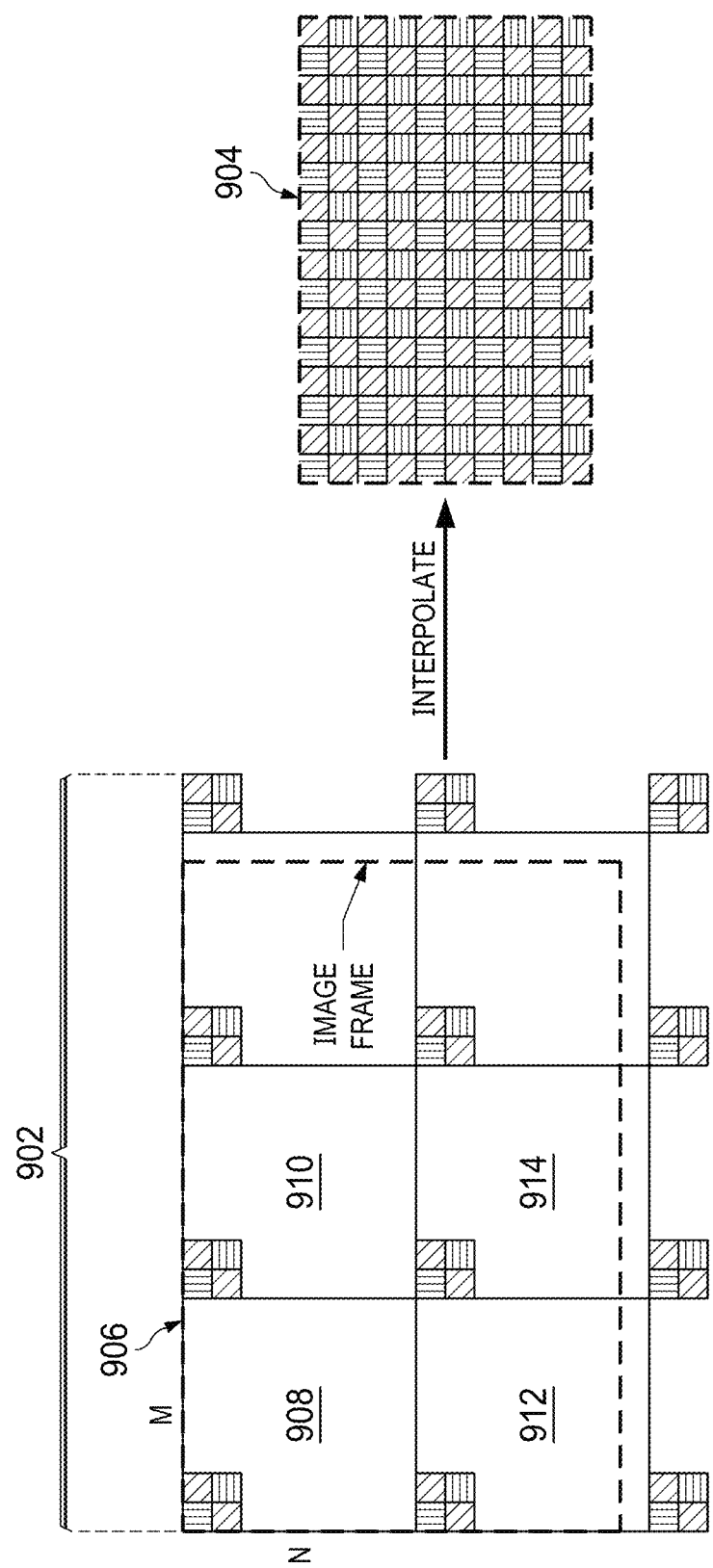
FIG. 9 illustrates subsampled and up-sampled gain maps for a 2×2 Bayer pattern CFA.

FIG. 7 is a flowchart illustrating the lens shading correction process by the front-end processor 506 using gain maps and up-sampling, according to some examples. As described herein, the lens shading correction process 700 of FIG. 7 can be used for up to 4 independent channels and 8 phases in 2×2 and 4×4 RGBIR CFA patterns. In some examples, the lens shading correction process 700 uses 4 or 8 independent retrospective correction fields (e.g., gain maps) (as illustrated in FIG. 9) for color channels and/or pixel phases present in the input image data 504 from an image sensor 502. The lens shading correction process 700 of FIG. 7 supports 4×4 CFAs, and provides explicit image pixel positioning in hashing LUTs for gain map channel mapping.

In some examples, as mentioned previously, the front-end processor 506 performs the lens shading correction process to input image data 504 from an image sensor 502. The lens shading correction process 700 shown in FIG. 7 is described as to a single image pixel of an input image (e.g., input image data 504 of FIG. 5), the process 700 applies to each image pixel of an input image. The input image data 504 can include a 2×2 Bayer image or a 4×4 RGBIR image.

The lens shading correction process 700 includes for a given image pixel at a given image pixel location, the front-end processor 506 receiving a value from a hashing lookup table (LUT) (at 704), the front-end processor 506 receiving a value from gain map LUTs (at 706), and also the front-end processor 506 receiving the location of the image pixel of an image (at 702). The value from the hashing LUT and/or from the gain map LUTs corresponds to the image pixel location of the given image pixel. The image also provides the value of the image pixel of the image, represented by I(x, y). In some examples, instead of receiving one value from the hashing LUT or the gain map LUTs, the front-end processor 506 receives more than one value from the hashing LUT and/or the gain map LUTs for the given image pixel.

Once the front-end processor 506 receives values from the hashing lookup table, the gain map lookup table, and the location of an image pixel of the image, as a part of the lens shading correction process 700, the front-end processor 506 determines anchor gain values (at 710). As described below with regards to FIG. 9, the gain maps stored in the gain map LUTs are sub-sampled and/or down-sampled (i.e., the resolution of the gain maps are lower than that of the input image), and determining anchor gain values addresses the sampled and/or down-sampled gain maps. In some examples, the front-end processor 506 obtains the anchor gain value from the gain map LUT using the getAnchorValue function. The front-end processor 506 also determines which gain map to use based on the programmed hashing LUT.

Once the front-end processor 506 determines the anchor values, as a part of the lens shading correction process 700, the front-end processor calculates image pixel level gain values (at 712). To calculate the gain to be applied to a given pixel, the front-end processor 506 interpolates the image pixel-level gain value using four surrounding anchors gain values for a particular image pixel. For the image pixel at image pixel location (x, y), the front-end processor 506 calculates the interpolated image pixel-level gain value based on the following equation:

$$g(x, y) = \frac{\begin{pmatrix} (M-k) \times (N-l)g0 + (k) \times (N-l)g1 + \\ (M-k) \times (l)g2 + (k) \times (l)g3 \end{pmatrix}}{MN}$$

where
k=x mod M;
l=y mod N;
i=⌊x/M⌋×M;
j=⌊y/N⌋×N;
g0=getAnchorValue(i, j, x, y);
g1=getAnchorValue(i+M, j, x, y);
g2=getAnchorValue(i, j+N, x, y);
g3=getAnchorValue(i+M, j+N, x, y); and
M and N are the dimensions of the sensor.

Accordingly, once the front-end processor 506 calculates the image pixel-level gain value for an image pixel, the front-end processor 506 calculates a shading corrected image pixel value from the image pixel-level gain value and the image pixel value of the image pixel from the input image data (at 714), as described herein. In some examples, the front-end processor 506 sends the shading corrected image pixel value on to other image signal processors for further processing (e.g., the intermediate processor 508 of FIG. 5).

In some examples, the intermediate input data sent to the intermediate processor 508 from the front-end processor 506 includes the shading corrected image pixels as processed by the lens shading correction process.

Figure 8:
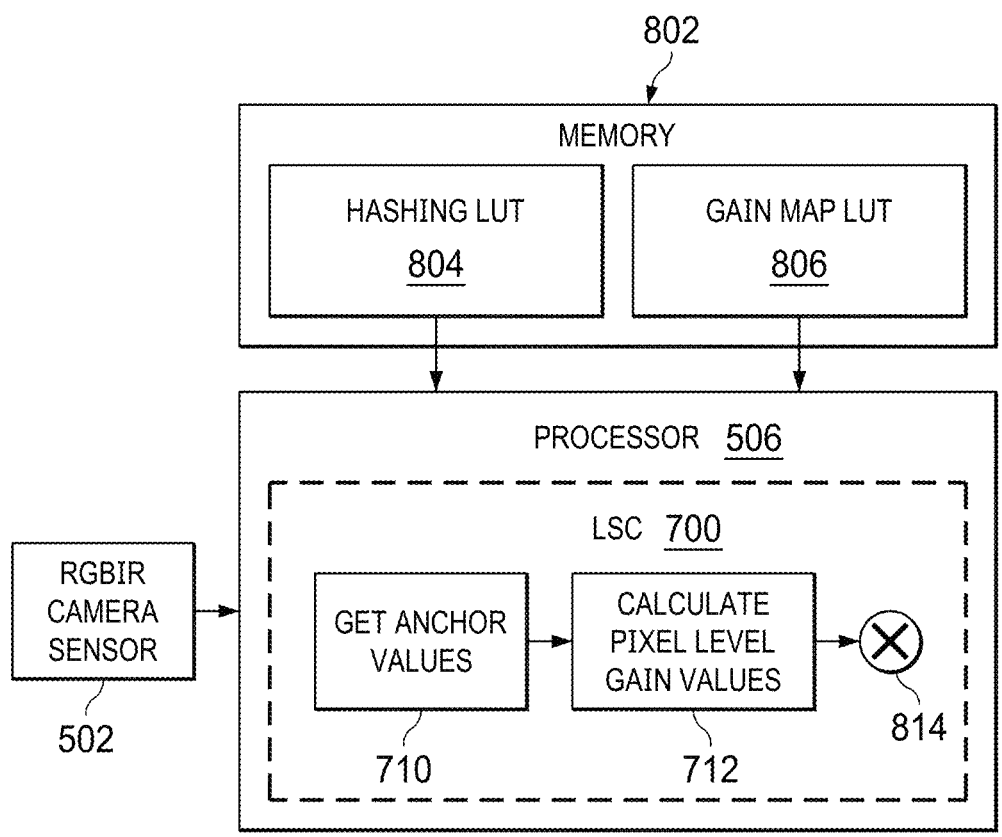
FIG. 8 is a block diagram illustrating an example implementation of a portion of an image signal processing system, according to some examples.

FIG. 8 is a block diagram illustrating an example implementation of a portion of an image signal processing system for the lens shading correction process 700 of FIG. 7, according to some examples. Specifically, FIG. 8 illustrates the front-end processor 506 configured to implement the lens shading correction process 700 of FIG. 7 using LUTs stored in memory 802. As described, the front-end processor 506 performs image signal processing, including the lens shading correction process 700 of FIG. 7, to the incoming image data from the image sensor 502. The lens shading correction process 700, as implemented by the front-end processor, uses values from a hashing LUT 804 and a gain map LUT 806 (which includes e.g., sub-sampled gain maps 902, interpolated gain maps 904 of FIG. 9) in memory 802 to generate shading corrected image pixel values 814 for each image pixel of the incoming image data from the image sensor 502.

As mentioned, the front-end processor 506 receives input image data 504 from an image sensor 502. For each image pixel of the input image data 504, regardless whether the sensor pixel is a R, G, B, or IR, the front-end processor 506 applies the lens shading correction process 700.

As illustrated, the front-end processor 506 is coupled to memory 802. The memory 802 includes a hashing LUT 804 and a gain map LUT 806. While memory 802 includes hashing LUT 804 and gain map LUT 806, memory 802 can include any number of hashing LUTs and any number of gain map LUTs (e.g., 4 gain map LUTs, 8 gain map LUTs). In some examples, hashing LUT 804 determines what gain map LUT 806 is used for a particular image pixel. For example, pixel 150 (FIG. 1B) uses gain map LUT 0, and pixel 155 (FIG. 1B) uses gain map LUT 2. The front-end processor 506 is also coupled to the RGBIR image sensor 502, and is coupled to receive image data 504 from the RGBIR image sensor 502. Once the front-end processor 506 receives the image data 504 from the RGBIR image sensor 502, the front-end processor 506 performs front-end processing, including lens shading correction 700. The lens shading correction 700, as previously described, involves receiving values from the hashing LUT 804 and the gain map LUTs 806 in memory 802, determining anchor values (at 710), and calculating image pixel-level gain values (at 712) to determine the shading corrected image pixel values 714.

As mentioned, the front-end processor 506 receives values from a gain map LUT 806 stored in memory 802. These gain map LUTs 806 are stored in the memory 802 in m×n down-sampled resolution and the channel-wise quantized gain values are stored in 8-bit fixed point representation.

FIG. 9 illustrates subsampled gain maps 902 and interpolated gain maps 904 for a 2×2 Bayer pattern CFA. Because the gain maps 902 stored in LUTs are subsampled, the front-end processor 506 can interpolate the sub-sampled gain maps 902 to generate interpolated gain maps 904, which are used to determine anchor gain values. In some examples, each gain map corresponding to a m×n block of image pixels of the input image includes an anchor 906, which can be located at a corner of the gain map. The location of the anchor 906 can also correspond to a location of the m×n block of image pixels. As illustrated in FIG. 9, the gain map 908 includes a set of gain values defined at the anchor 906 at top left corner of the m×n block 908. Similarly, the gain maps 910, 912, 914 of neighboring adjacent m×n blocks also include a set of gain values defined at their corresponding anchors at the top left corner. These gain values defined at the anchor 906 of gain maps 908, 910, 912, 914 provide the anchor gain values needed for interpolation and the corresponding interpolated gain maps 904. In some examples, the front-end processor 506 uses bilinear interpolation to determine the interpolated gain maps 904. The front-end processor 506 then uses the interpolated gain maps 904 to determine a shading corrected image pixel value for a given image pixel.

Referring back to FIG. 8, the gain maps are stored in the gain map LUT 806 in memory 802 coupled to the front-end processor 506. In some examples, the gain maps are stored as interleaved channels in raster scan order as illustrated in Tables 2 and 3. Here, Table 2 shows storage format for the interleaved 4 gain maps storage with 4 gain values per 32 bit word. Table. 3 shows storage format for the interleaved 8 gain maps interleaved again as 4 gain values per 32 bit word and 8 gain values for every two 32-bit words. Each word in the gain map LUT 806 represents the m×n block in sub-sampled resolution. At full resolution it is assumed to be at base of the block acting as an anchor for the block.

TABLE 2

| Byte address | Byte 3 | Byte 2 | Byte 1 | Byte 0 | Word address |
|---|---|---|---|---|---|
| 0x0FFCh | wx_chnn3 | wx_chnn2 | wx_chnn | wx_chnn | word x |
| ... | ... | ... | ... | ... | ... |
| 0x0004h | w1_chnn3 | w1_chnn2 | w1_chnn1 | w1_chnn0 | word 1 |
| 0x0000h | w0_chnn3 | w0_chnn2 | w0_chnn1 | w0_chnn0 | Word 0 |

TABLE 3

| Byte address | Byte 3 | Byte 2 | Byte 1 | Byte 0 | Word address |
|---|---|---|---|---|---|
| 0x0FF8h | wy_chnn7 | wy_chnn6 | wy_chnn5 | wy_chnn4 | word 2y + 1 |
| | wy_chnn3 | wy_chnn2 | wy_chnn1 | wy_chnn0 | word 2y |
| ... | ... | ... | ... | ... | ... |
| 0x0008h | w1_chnn7 | w1_chnn6 | w1_chnn5 | w1_chnn4 | word 1 |
| | w1_chnn3 | w1_chnn2 | w1_chnn1 | w1_chnn0 | word 1 |
| 0x0000h | w0_chnn7 | w0_chnn6 | w0_chnn5 | w0_chnn4 | Word 0 |
| | w0_chnn3 | w0_chnn2 | w0_chnn1 | w0_chnn0 | Word 0 |

The anchor pixel values can be accessed using the image pixel indexes in the native resolution of the input image. Considering that the front-end processor 506 may have to process 4×4 (and 2×2) CFA patterns, the front-end processor 506 allows use of the hashing LUT 804 to map image pixel positions in the input image data 504 to one of the gain maps stored in the gain map LUTs 806. For example, all Phase 0 (R) image pixel 150 in of a CFA of input data 504 can be programmed to use w*_chnn1 and so on. Accordingly, each of the 16 image pixel positions the gain-map relationship is enumerated spatially, independent of the actual image pixel color, in each 4×4 CFA as shown in FIG. 1B.

As mentioned, the memory 802 includes a hashing LUT 804. The front-end processor 506 enables the hashing LUT 804 disclosed here programmable modes of operation where one mode of operation allows for storage and use of 4 gain map LUTs and another mode of operation allows for storage and use of 8 gain map LUTs. In some examples, the image signal processing system 500 can configure the hashing LUT 804 with yet another mode of operation, which includes the fixed mapping of the channels/pixel position in 2×2 CFA pattern to 4 gain maps.

The mapping is intended for 4×4 RGBIR support. However, the mapping can also be used in 2×2 RGB sensors by repeating the 2×2 pattern 4 times (2 horizontally and 2 vertically) to form 4×4 pattern and applying 16 entries hashing LUT for corresponding 16 pixels to 4 or 8 channel gains in the LUT.

In some examples, to improve programming time in multi-camera processing, which requires different gain map LUTs, the memory 802 can be configured to support 8 gain maps using dual 4 channel groups (gain0-3 and gain4-7). In such examples, the memory 802 can also support reprogramming of one of the 4-channel groups for use in next frame while the front-end processor 506 uses the other 4-channel group for the current frame.

As mentioned, the front-end processor 506 determines the anchor values (at 710), as a part of the lens shading correction process 700, and then the front-end processor 506 calculates image pixel level gain values (at 712). Once the front-end processor 506 completes calculation of the image pixel level gain values, the front-end processor 506 generates the lens shading corrected value 814 for each image pixel of the input image.

As described, the image signal processing system herein supports 4×4 CFA inputs. Furthermore, the image signal processing system herein supports raw-domain Lens Shading Correction for up to 4 independent channels and 8 phases in 2×2 and 4×4 RGBIR CFA patterns, with capability to store more than one camera LUTs for quicker parameters switching for cameras with independent shading models. The image signal processing system herein can also produce full-resolution RGB and IR images from the 4×4 RGBIR image using a two stage pipeline, which includes the front-end processor 506 and the intermediate processor 508.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Unless otherwise stated, "about," "approximately," or "substantially" preceding a value means +/−10 percent of the stated value.

While the foregoing is directed to specific examples, other and further examples may be devised without departing from the basic scope thereof, and the scope thereof is determined by the claims that follow.

What is claimed is:

1. A system, comprising:
a first processor configured to receive image input data from a red-green-blue infrared (RGBIR) sensor, the image input data comprising RGBIR image data;
a second processor coupled to the first processor, the second processor configured to:
receive first intermediate image data from the first processor;
separate red-green-blue (RGB) image data of the first intermediate image data from infrared (IR) image data of the first intermediate image data to generate second intermediate image data that includes the red-green-blue (RGB) image data and third intermediate image data that includes the infrared (IR) image data;
a third processor coupled to the second processor, the third processor configured to receive the third intermediate image data from the second processor and to process the third intermediate image data; and
a fourth processor coupled to the second processor, the fourth processor configured to receive the second intermediate image data from the second processor and to process the second intermediate image data.

2. The system of claim 1, further comprising:
a fifth processor coupled to outputs of the first processor and the second processor, the fifth processor configured to:
generate first statistical data based on the first intermediate image data;
generate second statistical data based on the second intermediate image data;
output the first statistical data for sensor configuration; and
output the second statistical data for sensor configuration.

3. The system of claim 2, wherein the second processor is configured to provide second image data to the fifth processor, wherein the second image data is different from the second intermediate image data.

4. The system of claim 1, wherein the first intermediate image data comprises red-green-blue infrared (RGBIR) image data.

5. The system of claim 1, wherein the image input data comprises a 4×4 color filter array.

6. The system of claim 5, wherein the 4×4 color filter array comprises a plurality of pixel types and a plurality of channels.

7. The system of claim 1, wherein the first processor is configured to generate the first intermediate image data by scaling each pixel of the input image data by a corresponding pixel-level gain value.

8. The system of claim 7, wherein the pixel-level gain value is based on an interpolation of anchor values for adjacent pixels of a respective pixel, and dimensions of a sensor coupled to the system.

9. The system of claim 7, wherein the pixel-level gain value is stored in a lookup table in memory.

10. The system of claim 9, wherein the pixel-level gain value is stored in 8-bit fixed point.

11. The system of claim 9, wherein the pixel-level gain value is stored in the memory as a channel in raster scan order.

12. The system of claim 9, wherein each word in the lookup table comprises a block having a first dimension and a second dimension in a subsampled resolution.

13. The system of claim 9, wherein the lookup table is configured to store a plurality of gain maps interleaved in a first word and a second word.

14. The system of claim 13, wherein each byte of the first word and the second word is configured to store a different gain value.

15. The system of claim 14, wherein the first word is configured to store gain values for a first frame of the input image data, and the second word is configured to store gain values for a second frame of the input image data, wherein the first frame precedes the second frame.

16. The system of claim 7, wherein the first processor is configured to receive the input image data from a set of image sensors.

17. The system of claim 7, wherein the first processor is further configured to determine the pixel-level gain value by:
determining a set of anchor values from values in a gain map lookup table, a hashing lookup table, and pixel locations; and
determining the pixel-level gain value based on the set of anchor values.

18. A system, comprising:
a red-green-blue infrared (RGBIR) sensor;
a first processor coupled to the RGBIR sensor and configured to:
receive image input data from the RGBIR sensor, the image input data comprising RGBIR image data; and
generate first intermediate image data from the image input data;
a second processor coupled to the first processor, the second processor configured to:
separate red-green-blue (RGB) image data of the first intermediate image data from infrared (IR) image data of the first intermediate image data to generate second intermediate image data that includes the red-green-blue (RGB) image and third intermediate image data that includes the infrared (IR) image data;
a third processor coupled to the second processor, the third processor configured to process the third intermediate image data; and
a fourth processor coupled to the second processor, the third processor configured to process the second intermediate image data.

19. The system of claim 18, wherein the first processor is configured to generate the first intermediate image data by scaling each pixel of the input image data by a corresponding pixel-level gain value using a first lookup table and a second lookup table.

20. The system of claim 19, wherein the first lookup table is a gain map lookup table and the second lookup table is a hashing lookup table.

* * * * *